Aug. 26, 1930.    B. A. MAYER    1,774,028
INCUBATOR
Filed March 25, 1926
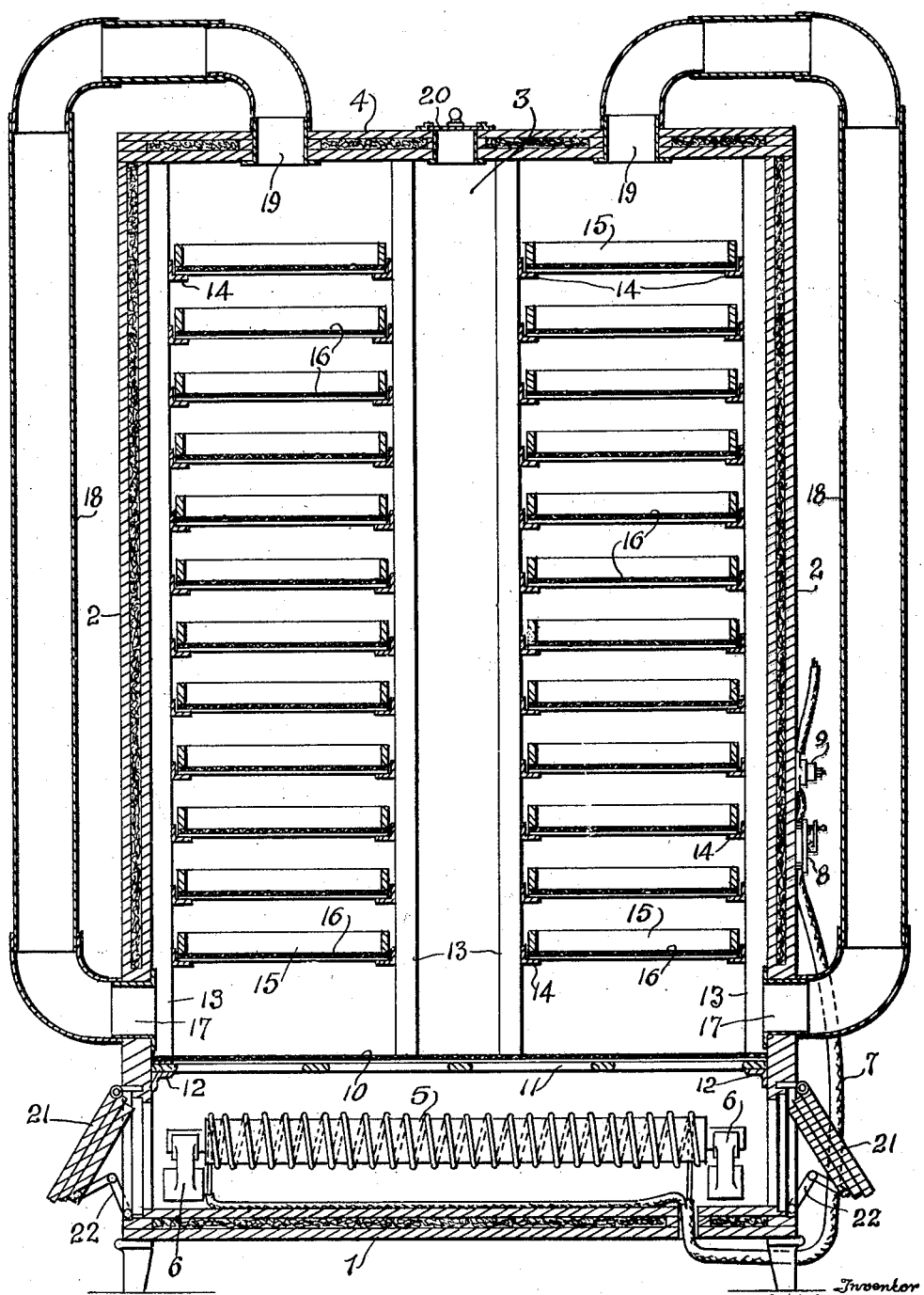
Inventor
Bruce A. Mayer,
By Toulmin & Toulmin,
Attorneys Patented Aug. 26, 1930

1,774,028

UNITED STATES PATENT OFFICE

BRUCE A. MAYER, OF SPRINGFIELD, OHIO

INCUBATOR

Application filed March 25, 1926. Serial No. 97,431.

My invention relates to incubators.

It is the object of my invention to secure an even temperature by natural circulation throughout an incubator chamber without the resort to artificial means for creating circulation.

Referring to the drawing, there is shown a section through the incubator.

Referring to the drawing in detail, it will be observed that I have provided an incubator box having the usual insulated side, top and bottom walls which is provided with the usual doors. The bottom is designated 1; the side walls 2, the rear wall 3, and the top 4. The doors are not shown for the purpose of clearness, but they may be of any desired character customary in the art.

In the bottom of the incubator chamber I provide a heating element which may be of any desired character, such as the electric heating element 5 mounted upon the brackets 6. Current for the heating element is supplied through the cable 7 controlled by the rheostat 8 and the switch 9.

Above the heating element is a perforated screen or netting 10, which is supported by cross-members 11 and shoulders 12. The screen is to prevent down and other easily inflammable matter falling onto the electric heater and catching fire. Mounted upon some of these cross-members and shoulders are the uprights 13 which carry the guideways 14 for the trays 15 having the wire netting bottoms 16. Any form or arrangement of trays may be provided. The lowermost trays are located at a predetermined distance above the netting 10 to permit of the introduction of the circulating pipe in the side wall 2 at a point below the lowermost tray. These circulating pipes, of which there may be any number, are provided with an inlet opening 17 near the bottom of the compartment for introducing cooled air which has passed downwardly through the pipe 18 which communicates with the exit opening 19 at the top of the incubator, preferably over the trays containing the eggs.

These circulating pipes may be arranged in any desired fashion so long as they provide an exit at the top for the heated air, a means of conveying the air downwardly to the bottom of the compartment where in its cooled condition it mixes with the upwardly rising heated air, passing through the egg trays around the eggs to the top of the cabinet where the air makes its exit through the opening 19.

It will be noted that this arrangement insures continuous circulation of the air of its own momentum with the artificial stimulation or actuation. This results in uniform temperatures being maintained throughout the chamber.

A small ventilator 20 is provided in the top of the cabinet for the usual purposes. This ventilator will normally be closed. Doors 21 are provided in the bottom of the cabinet which may be held open by the folding arms 22 when it is desired to admit fresh air.

It will be understood that I desire to comprehend within my invention various modifications. It is obvious that the pipes may be of any number and may be arranged outside of the incubator, within the incubator, or through its walls. The principle of operation will remain the same.

Having thus fully described my invention, what I claim as new and desire to secure by Letters Patent, is:

1. In combination, a cabinet, a heating compartment in the bottom thereof having a perforated top to prevent down falling on the heater, a plurality of trays supported in the cabinet above the heating compartment, the lowermost tray being spaced a predetermined distance above the perforated heating compartment top, a pipe leading from the side wall of the cabinet at a point between the perforated top and the bottom tray to the top of the cabinet over the trays where it again communicates with the interior of the cabinet said pipe being completely outside of the cabinet and not connected therewith or attached thereto in any way except at its point of exit and entrance therefrom.

2. In combination, a cabinet, a heating compartment in the bottom thereof having a perforated top to prevent down falling on the heater, a plurality of trays supported in the cabinet above the heating compartment, the lowermost tray being spaced a predetermined distance above the perforated heating compartment top, a pipe leading from the side wall of the cabinet at a point between the perforated top and the bottom tray to the top of the cabinet over the trays where it again communicates with the interior of the cabinet, and a second unit of trays and a second pipe oppositely disposed from the first mentioned unit of trays and pipe said pipes being completely outside of the cabinet and not connected therewith or attached thereto in any way except at its point of exit and entrance therefrom.

3. In combination, a cabinet, a heating compartment in the bottom thereof having a perforated top to prevent down falling on the heater, a plurality of trays supported in the cabinet above the heating compartment, the lowermost tray being spaced a predetermined distance above the perforated heating compartment top, a pipe leading from the side wall of the cabinet at a point between the perforated top and the bottom tray to the top of the cabinet over the trays where it again communicates with the interior of the cabinet, a second unit of trays and a second pipe oppositely disposed from the first mentioned unit of trays and pipe, and means in said cabinet for regulating the entrance thereto of fresh air and the exit therefrom of foul air said pipes being completely outside of the cabinet and not connected therewith or attached thereto in any way except at its point of exit and entrance therefrom.

In testimony whereof, I affix my signature.

BRUCE A. MAYER.